United States Patent [19]

Szczepanek

[11] Patent Number: 4,933,662

[45] Date of Patent: Jun. 12, 1990

[54] COMPARATOR HAVING VARIABLE WIDTH COMPARISONS

[75] Inventor: Andre Szczepanek, Brickhill, England

[73] Assignee: Texas Instruments Incorporated, Dallas, Tex.

[21] Appl. No.: 348,107

[22] Filed: May 1, 1989

Related U.S. Application Data

[63] Continuation of Ser. No. 259,492, Oct. 17, 1988, abandoned, which is a continuation of Ser. No. 830,159, Feb. 18, 1986, abandoned.

[51] Int. Cl.[5] .............................................. G06F 7/04
[52] U.S. Cl. .................................................. 340/146.2
[58] Field of Search ...................................... 340/146.2

[56] References Cited

U.S. PATENT DOCUMENTS

| | | | |
|---|---|---|---|
| 3,434,109 | 3/1969 | Coote | 340/146.2 |
| 3,938,087 | 2/1976 | Louie | 340/146.2 |
| 3,962,680 | 6/1976 | Hirao | 340/146.2 |
| 4,012,714 | 3/1977 | Lohmann | 340/146.2 |
| 4,450,432 | 5/1984 | Schmidtpott | 340/146.2 |
| 4,752,763 | 6/1988 | Hoffman | 340/146.2 |

OTHER PUBLICATIONS

McCarthy, "Digital Comparison Within a Tolerance", *IBM Tech. Disclosure Bulletin*, vol. 13, No. 10, Mar. '71, pp. 2975-2977.

*Primary Examiner*—David H. Malzahn
*Attorney, Agent, or Firm*—Thomas W. Demond

[57] ABSTRACT

A method of comparing two binary quantities, which includes comparing corresponding bits of each of the binary quantities and generating comparison signals to indicate equality and inequality of corresponding bits of the quantities. The comparison signals are transferred to a transfer line with the signals being arranged in order on the transfer line from the signal corresponding to the most significant bits to that corresponding to the least significant bits. A selected number of the comparison signals are coupled in order of priority from that corresponding to the most significant bits to that corresponding to the least significant bits, to an output EQUALS line in response to a plurality of decode signals.

29 Claims, 3 Drawing Sheets

COMPARATOR HAVING VARIABLE WIDTH COMPARISONS

This application is a continuation of application Ser. No. 07/259,492, filed Oct. 17, 1988, now abandoned, which is a continuation of Ser. No. 06/830,159, filed Feb. 18, 1986, now abandoned.

BACKGROUND OF THE INVENTION

The present invention relates to a logical equals comparator circuit for comparing binary quantities to determine whether or not they are equal.

An equals comparator is usually constructed by utilizing an exclusive OR circuit applied to the operands at each bit position, and then applying the output of the latter circuit to a NOR circuit to provide an active high output. It is often necessary to ignore a certain number of least significant bits in effecting such comparisons. For example, the significance of two binary quantities may be such that they are equal if a given number of the most significant bits are equal because the remaining bits are in the noise level or otherwise unmeasurable. In such circumstances a normal comparator may indicate inequality for two equal quantities. Thus, it would be necessary to tailor the comparator to the number of significant figures of each of the quantities. Should, however, the accuracy of the quantities for some reason change then either bits having no significance would be compared or not all of the significant bits would be compared. In implementing such a comparator into MOS semiconductor technology one would not be able to change the comparator physically.

Accordingly, it is an object of the present invention to provide a method of changing the number of bits that a comparator compares without having to redesign the comparator. It is a further object of the present invention to provide a comparator that allows any number of least significant bits to be ignored.

SUMMARY OF THE INVENTION

According to the invention there is provided a method of comparing two binary quantities, which includes comparing corresponding bits of each of the binary quantities and generating comparison signals to indicate equality and inequality of corresponding bits of the quantities. The comparison signals are transferred to a transfer line with the signals being arranged in order on the transfer line from the signal corresponding to the most significant bit to that corresponding to the least significant bit. A selected number of the comparison signals are coupled in order of priority from that corresponding to the most significant bits to that corresponding to the least significant bits, to an output EQUALS line in response to a plurality of decode signals.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

In the different Figures generally like reference numbers refer to like circuit elements which function identically.

Referring to FIG. 1 there is shown a 4 bit equals comparator having 4 exclusive OR (XOR) gates 10, 12, 14 and 18 having as input pairs bits [X(0),Y(0)], [X(1),Y(1)], [X(2),Y(2)], and [X(3),Y(3)], respectively. The outputs of the latter XOR circuits 10, 12, 14, and 18 are coupled to a transfer line 19 at transfer points 20, 22, 24 and 26, respectively. As shown in FIG. 1A, at each transfer point there is coupled a field effect transistor 43 from transfer line 19 to ground. The gate C of transistor 43 is connected to an output of a corresponding XOR circuit. The relationship of the representation of transistor 43 to the usual symbol 45 for a field effect transistor is shown in FIG. 1A.

Figure 1:
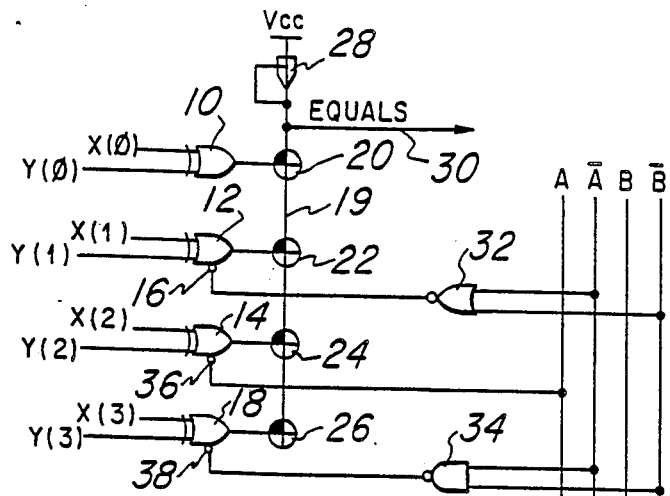
FIG. 1 is a schematic circuit diagram of a four bit equals comparator using two different gate types.
Figure 1A:
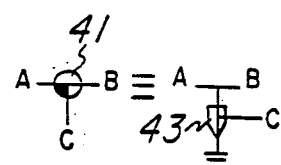
FIG. 1A is a legend showing the usual schematic representations of the symbols shown in FIG. 1.
Figure 1A:
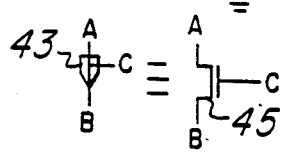

To the transfer line 19 there is also connected through a depletion mode transistor 28 a precharging voltage source Vcc. Four decode lines A, A—, B, and B— are used as inputs to a NOR circuit 32 and to a NAND circuit 34. A comparator output EQUALS signal 30 is coupled to line 19 after transfer point 20 corresponding to the exclusive OR circuit for the most significant bits [X(0),Y(0)].

Each XOR circuit provides a low output when its two input bits are equal and a high output when they are not equal. The high output turns on an associated one of the transistors 43 and grounds line 19. If it is transfer point 20 which grounds line 19 which is normally held high at voltage Vcc by transistor 28 and the Vcc voltage source (not shown) then EQUALS line 30 goes low. Thus unequal binary numbers result in a low output while a high output results for equal binary numbers.

Four decode lines A, A—, B, and B— are provided to control the operation of all XOR circuits 12, 14, and 18 except that for the most significant bit pairs [X(0),Y(0)]. The output of NOR circuit 32 is (A—+B—)— which is equivalent to A.B and that of the NAND circuit 34 is (A—.B—)— which is equivalent to A+B. Thus, XOR circuit is disabled if NOR circuit 32 provides a high output to control input 16 corresponding to A.B being true. XOR circuit 14 is gated off if A applied to control input 36 is a logic one (or true). XOR circuit 18 is disabaled by NAND circuit 34 applying a logic one output to control input 38 whenever A+B is true. It can be readily confirmed that if both A and B are high then all three least significant bits are disabled. If A is one and B is zero the two least significant bits (i.e. XOR circuits 14 and 18) are disabled. If A is set to zero and B to one then only XOR circuit 18 is disabled (corresponding to one least significant bit) while if both A and B are set to zero then no XOR circuits are disabled and all bits are compared.

Figure 2:
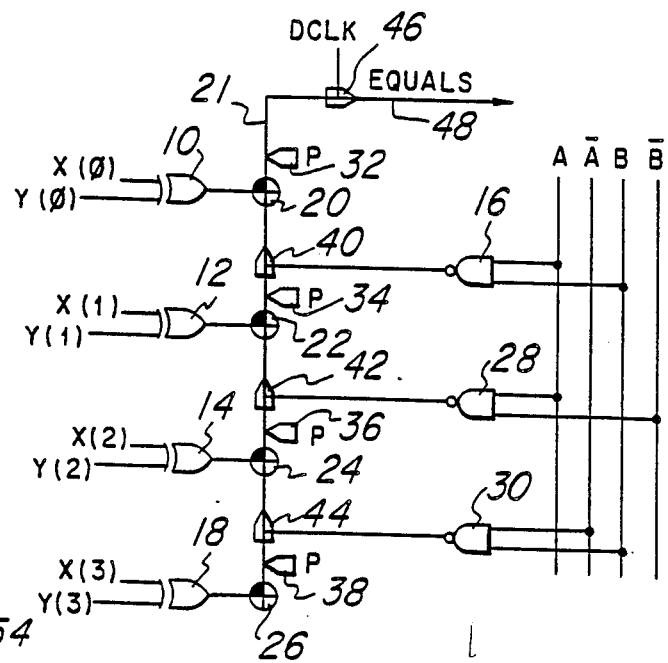
FIG. 2 is a schematic circuit diagram of an alternative four bit equals comparator using only a single type of gate.
Figure 3:
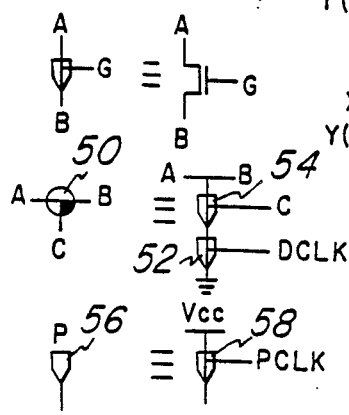
FIG. 3 is a legend explaining some of the symbols used in the drawings.

A variant of the four bit comparator of FIG. 1 is shown in FIG. 2 which utilizes 3 NAND gates 16, 28 and 30 rather than the NOR gate of FIG. 1 and uses field effect transistors 40, 42, and 44 between adjacent transfer points 20, 22, 24 and 26. Each transfer point consists of two series connected transistors 52 and 54 as seen in FIG. 3. As in FIG. 1, transistor 54 is gated on by an associated XOR output while transistor 52 is gated on every positive half cycle of clock signal DCLK. Proximate each transfer point 20, 22, 24, and 26 there is a precharging transistor 32, 34, 36, and 38 which, as shown in FIG. 3, each consists of a transistor 58 coupled to Vcc and gated on by a clock signal PCLK which is non-overlapping with DCLK. A transistor 46 whose gate is coupled to the clock signal DCLK controls the passage of the signal on a transfer line 21 to an output EQUALS line 48.

The portion of transfer line 21 between transistors 40 and 46, 42 and 40, 44 and 42 and below 44 as seen in FIG. 2 are isolated from EQUALS line 48 and from each other portion until one or both of its isolating transistors is turned on. Thus, for example, the effect of the voltage on that portion of transfer line 21 between transistors 42 and 44 would not be felt on EQUALS line 48 unless all of transistors 42, 40, and 46 were turned on. The logic created by the arrangement of the coupling of NAND gates 16, 28 and 30 to lines A, A_, B, and B is such that if $A=1$ and $B=1$ then only XOR circuit 10 operating on transfer point 20 is coupled to EQUALS line 48 when transistor 46 is gated on by a DCLK signal. If $A=1$ and $B=0$ then both transfer points 20 and 22 are coupled through transistor 46 to EQUALS line 48. If $A=0$ and $B=1$ then both transistors 40 and 42 will be turned on coupling transfer points 20, 22 and 24 to EQUALS line 48 through transistor 46. Finally, if both A and B are zero then all of transistors 40, 42, and 44 will be on. Accordingly, by simply selecting values of A and B one can determine the number of bit pairs that are used to determine equality of any pair of 4 bit binary quantities. It will be appreciated that after every positive half cycle of DCLK which turns on transistors 52 and 46, any drop in voltage on transfer line 21 is restored by precharge transistors 32, 34, 36 and 38 which are gated on by PCLK thereby coupling Vcc to that portion of transfer line 21.

Figure 4:
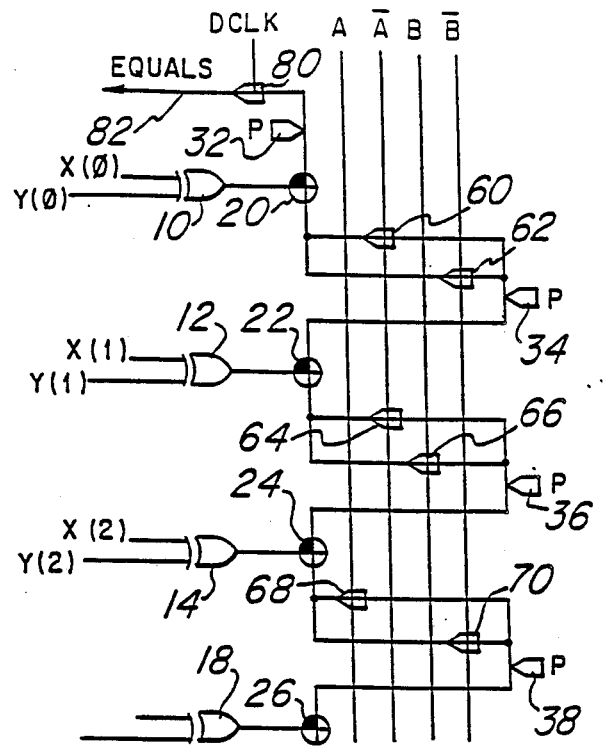
FIG. 4 is a circuit diagram of a four bit equals comparator which eliminates the use of logic gates.

An equivalent circuit to that of FIG. 2 is shown in FIG. 4 which rather than logic circuits utilizes instead transistors 60, 62, 64, 66, 68, and 70 to open circuit paths between transfer points 20, 22, 24 and 26. The logic arrangement is the same as for that of FIG. 2.

Figure 5:
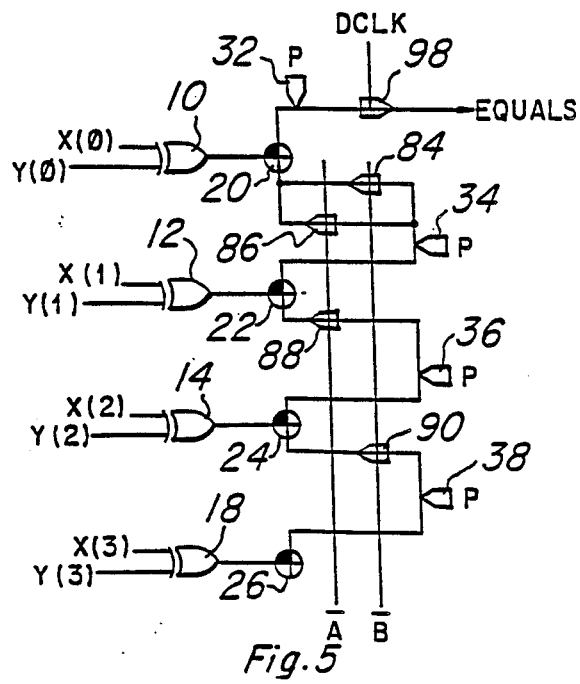
FIG. 5 is a circuit diagram of yet another four bit equals comparator variant which eliminates not only the use of logic gates but also the need for four decode lines.

A circuit which functions the same as those of FIGS. 2 and 4 but eliminates the need for true and inverse decode lines is shown in FIG. 5. In this case the arrangement of transistors 84, 86, 88, and 90 produces the logic equivalent of FIGS. 2 and 4.

Figure 6:
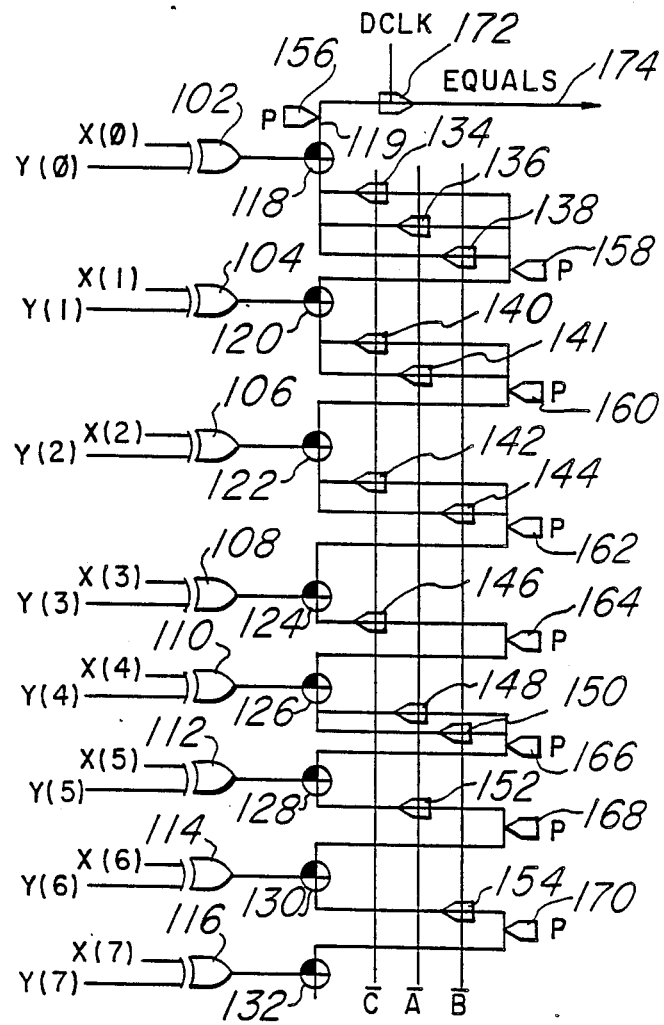
FIG. 6 is a circuit diagram of an 8 bit equals comparator.

Although only 4 bit comparators have been disclosed in FIGS. 1 to 5, the same technique can be extended to any number of bits. Referring to FIG. 6 there is shown an 8 bit comparator. In this case, however, an additional decode line C is required since an 8 bit comparator is really two 4 bit comparators in series. In this case XOR circuits 102, 104, 106, 108, 110, 112, 114, and 116 couple to respective transfer points 118, 120, 122, 124, 126, 128, 130, and 132. Transistors 134, 136, 138, 140, 141, 142, 144, 146, 148, 150, 152, and 154 control circuit paths between the latter mentioned transfer points as shown in FIG. 6. Precharge transistors 156, 158, 160, 162, 164, 166, 168, and 170 restore the voltage on portions of transfer line 119 proximate corresponding transfer points.

Whereas the logic arrangement of FIG. 5 was $A+B$, $.A$, and B for the transistors between pairs of transfer points 20 and 22, 22 and 24, and 24 and 26, respectively, the logic arrangement of the circuit of FIG. 6 is $C+A+B$, $C+A$, $C+B$, C, $A+B$, A, and B for the transistors between respective transfer points 118 and 120, 120 and 122, 122 and 124, 124 and 126, 126 and 128, 128 and 130, and 130 and 132. Thus, if $C=1$ only the first 4 most significant bits can be selected by values of A and B while if $C=0$ then all of the first 4 bits are selected and only bits of the last 4 bits may be selected depending on the values of A and B. Again transistor 172 gated by DCLK controls passage of the voltage level to EQUALS line 174.

In a similar way two 8 bit comparators can combine to produce a 16 bit comparator, four 8 bit comparators can make a 32 bit comparator and so on. Thus, in general N decode lines will produce a $2^N$ bit comparator and any number of bits can be made by simply designing a comparator for the next higher power of 2 and then deleting the unnecessary most significant bits.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A method of comparing two binary quantities, comprising:
   comparing corresponding bits of each of said quantities and generating comparison signals to indicate equality and inequality of corresponding bits;
   transferring said comparison signals to a transfer line wherein the signals on said transfer line are arranged in order from the signal corresponding to the most significant bit to that corresponding to the least significant bit; and
   coupling a selected number of said signals on said transfer line, in order of priority from that corresponding to the most significant bits to that corresponding to the least significant bits, to an output EQUALS line in response to a plurality of decode signals.

2. A method according to claim 1, wherein said comparing step is done by applying each bit of a corresponding pair of said bits to inputs of an associated exclusive OR circuit for that pair.

3. A method according to claim 2, wherein an output of said exclusive OR circuit corresponding to the pair of most significant bits, after being transferred to said transfer line, is coupled to said EQUALS line through a switch in response to a clock signal applied to said switch.

4. A method according to claim 3, wherein an output of each exclusive OR circuit corresponding to said pairs of associated bits is coupled to said transfer line at a associated transfer point and adjacent ones of said transfer points are separated by a gated switch operable to open in response to selected applied decode signals.

5. A method according to claim 4, wherein each transfer point includes a field effect transistor whose source/drain path is coupled from said transfer line to ground and whose gate is coupled to an output of a corresponding exclusive OR circuit and proximate each of said transfer points there is coupled to said transfer line a precharging voltage source Vcc through a source/drain path of a field effect transistor whose gate is connected to a clock signal source PCLK.

6. A method according to claim 4, wherein said decode signals are applied in pairs to selected logic circuits each output from which is connected to a gate of a corresponding one of said switches.

7. A method according to claim 2, wherein outputs of said exclusive OR circuits are each coupled to said transfer line at associated transfer points with all of said transfer points being in series in order from that corresponding to the most to that corresponding to the least significant pairs of bits and said exclusive OR circuit corresponding to the most significant pair of bits is coupled directly to said EQUALS line while the remaining exclusive OR circuits transmit an output signal in response to the application of associated control signals.

8. A method according to claim 7, wherein said control signals are outputs of logic circuits, inputs to said logic circuits being predetermined decode signals.

9. A circuit for comparing two binary quantities, comprising:
 means for comparing corresponding bits of each of said quantities and generating comparison signals to indicate equality and inequality of the corresponding bits;
 means for transferring said comparison signals to a transfer line at a transfer point, wherein the signals on said transfer line are arranged in order from that corresponding to the most significant bit to that corresponding to the least significant bit:
 an output EQUALS line;
 a plurality of decode lines: and
 means for coupling a selected number of said signals on said transfer line, in order of priority from that corresponding to the most significant bits to that corresponding to the least significant bits, to said output EQUALS line in response to selected signal levels on said decode lines.

10. A circuit according to claim 9, wherein said comparing means for each bit pair is an exclusive or circuit.

11. A circuit according to claim 10, wherein said coupling means is a plurality of switches coupled between selected ones of said transfer points and to predetermined ones of said decode lines wherein said switches are controlled by signal levels on said decode lines.

12. A circuit according to claim 11, wherein the number of decode lines for a $2^N$ bit comparator is N where N is any number.

13. A circuit according to claim 11, wherein said transfer points comprise a first switch coupled between said transfer line and ground, controlled by an output signal level of an associated exclusive OR circuit and said circuit including transfer line precharge means coupled proximate each of said transfer points and operative to charge said transfer line to a high voltage Vcc in response to a clock signal PCLK.

14. A circuit according to claim 13, wherein said transfer points further comprise a second switch coupled in series with said first switch and controlled by a clock signal DCLK and said circuit including an EQUALS line switch coupled between said EQUALS line and said transfer line also controlled by said DCLK signal wherein said DCLK signal is non-overlapping with said PCLK.

15. A circuit according to claim 14, wherein the number of exclusive OR circuits is 4, and including 2 decode lines A and B two first stage transistors controlling two signal paths from a transfer point corresponding to the most significant to that corresponding to the second most significant bit pair one of said transistors gated by the signal level on line A and the other by the signal level on line B, one second stage transistor controlling a signal path from a transfer point corresponding to the second most significant bit pair to that corresponding to the third most significant bit pair gated by the signal on line A and a third stage transistor controlling a signal path from a transfer point corresponding to the fourth most significant bit pair gated by the signal level on line B.

16. A circuit according to claim 14, wherein said precharge means is a transistor coupled between a voltage source Vcc and said transfer line.

17. A circuit according to claim 10, wherein said coupling means includes logic circuits having inputs coupled to said decode lines and outputs to control inputs on said exclusive OR circuits.

18. A method of comparing two binary quantities, comprising:
 comparing corresponding pairs of bits from each of said quantities;
 generating decode signals for selecting corresponding bit pairs from the two binary quantities;
 generating a respective comparison signal for the selected ones of said corresponding bit pairs to indicate equality and inequality of said corresponding bit pairs;
 outputting a first output signal when all of said respective comparison signals for said selected ones of said corresponding bit pairs indicate equality; and
 outputting a second output signal when any of said selected comparison signals indicate inequality.

19. The method claimed in claim 18 wherein said comparing step is performed by applying each bit of a corresponding pair of said bits to inputs of associated exclusive OR circuits, said exclusive OR circuits generating said comparison signals.

20. The method claimed in claim 19 wherein said generating step is performed by selecting the output of predetermined ones of said exclusive OR circuits.

21. The method claimed in claim 19 wherein said generating step is performed by inhibiting the output of predetermined ones of said exclusive OR circuits.

22. The method claimed in claim 18 wherein the comparison signal representative of the corresponding pair of the most significant bits of said binary quantities is always selected.

23. The method claimed in claim 18 wherein said step of generating decode signals comprises generating decode signals in response to signals indicative of the number of bits to be compared.

24. A circuit for comparing two multi-bit binary quantities, comprising:
 a plurality of comparators, one comparator for each corresponding pair of bits of said multi-bit binary quantities;
 said comparators each operative to generate a respective first comparison signal for each of said corresponding pair of bits which are equivalent and operative to generate a respective second comparison signal for each of said corresponding pair of bits which are not equivalent;

a selector for enabling a predetermined number of said comparators in response to signals indicative of the number of bits to be compared; and an output circuit responsive to said predetermined enabled comparators for outputting a first output signal when all of said enabled comparators generate said first comparison signal and outputting a second output signal when any one of said enabled comparators generate said second comparison signal.

25. The circuit as claimed in claim 24 wherein said comparators are exclusive OR gates.

26. The circuit as claimed in claim 24 wherein said selector generates a plurality of decode signals, each said decode signal being coupled to a different one of said comparators.

27. A circuit for comparing two multi-bit binary quantities, comprising:

a plurality of comparators, one comparator for each corresponding pair of bits of said multi-bit binary quantities;

said comparators each operative to generate a first comparison signal when said corresponding pair of bits are equivalent and operative to generate a second comparison signal when said corresponding pair of bits are not equivalent;

said comparison signals coupled to transfer points associated with each said comparators;

a selector, operative in response to signals indicative of the number of bits to be compared, to selectively couple predetermined ones of said transfer points to a transfer line; and an output circuit responsive to said transfer line for outputting a first output signal when all of said comparators associated with said predetermined ones of said transfer points generate said first comparison signal and outputting a second output signal when any one of said comparators associated with said predetermined ones of said transfer points generate said second comparison signal.

28. The circuit as claimed in claim 27 wherein said comparators are exclusive OR gates.

29. The circuit as claimed in claim 27 wherein a said predetermined transfer point grounds said transfer line when said associated comparator generates said second comparison signal.

* * * * *